United States Patent [19]
Yamauchi

[11] Patent Number: 5,758,736
[45] Date of Patent: Jun. 2, 1998

[54] POWER ASSIST APPARATUS OF POWER ASSISTED BICYCLE

[75] Inventor: Kosaku Yamauchi, Shizuoka-Ken, Japan

[73] Assignee: Suzuki Kabushiki Kaisha, Japan

[21] Appl. No.: 618,813

[22] Filed: Mar. 20, 1996

[30]  Foreign Application Priority Data

| Mar. 29, 1995 | [JP] | Japan | 7-071720 |
| Apr. 25, 1995 | [JP] | Japan | 7-101325 |
| Apr. 28, 1995 | [JP] | Japan | 7-106549 |

[51] Int. Cl.$^6$ ............................................. B62M 7/12
[52] U.S. Cl. ................. 180/220; 180/206; 180/65.2; 180/65.8
[58] Field of Search ................. 180/205, 220, 180/226, 206, 65.2, 65.1, 65.6, 214, 216, 230, 221, 222, 65.8, 65.7; 280/212, 214

[56] References Cited

U.S. PATENT DOCUMENTS

| 3,773,131 | 11/1973 | Jaulmes | 180/220 |
| 4,637,274 | 1/1987 | Goldenfeld | 180/205 |
| 5,375,676 | 12/1994 | Takata et al. | 180/206 |
| 5,474,148 | 12/1995 | Takata | 180/206 |
| 5,570,752 | 11/1996 | Takata | 180/206 |

FOREIGN PATENT DOCUMENTS

| 79573 | 5/1983 | European Pat. Off. . | |
| 0469995 | 2/1992 | European Pat. Off. | 180/220 |
| 2 669 585 | 5/1992 | European Pat. Off. . | |
| 569954 | 11/1993 | European Pat. Off. . | |
| 0 593 847 | 4/1994 | European Pat. Off. . | |
| 0 636 538 | 2/1995 | European Pat. Off. . | |
| 650887 | 5/1995 | European Pat. Off. . | |
| 675037 | 10/1995 | European Pat. Off. . | |
| 0541768 | 4/1956 | Italy | 180/205 |

*Primary Examiner*—Douglas C. Butler
*Attorney, Agent, or Firm*—Ronald P. Kananen

[57] ABSTRACT

A power assist apparatus of a power assisted bicycle comprises a crank shaft extending in the transverse direction of the body of the bicycle and rotatably driven by a footpedal-propelling, an electric motor for generating an assist power, a power composition shaft rotatably supported and extending in parallel with the crank shaft, a footpedal-propelling power transmission mechanism for transmitting the footpedal-propelling power to the power composition shaft at a right angle to the axis of the power composition shaft, an assist power transmission mechanism for transmitting the assist power to the power composition shaft at a right angle to the axis of the power composition shaft in the direction opposite to the direction in which the footpedal-propelling power is transmitted, a power composition output mechanism for outputting the rotating power of the power composition shaft to a driven wheel, a moment sensor for sensing a moment difference between two moments acting on the power composition shaft from two opposite directions when the footpedal-propelling power and the assist power are transmitted, and a control unit for calculating the assist ratio of the assist power to the footpedal-propelling power based on the magnitude and direction of the moment difference coming in from the moment sensor and controlling the output of the electric motor so that the assist ratio is kept at a constant ratio.

19 Claims, 7 Drawing Sheets

POWER ASSIST APPARATUS OF POWER ASSISTED BICYCLE

BACKGROUND OF THE INVENTION

1. Field of The Invention

The present invention relates to a power assisted bicycle which makes cycling easy when climbing a slope or when going against a head wind by mounting an electric motor to a body of a bicycle and by using assisting power of the motor to assist a cyclist to pedal. The invention specifically, relates to a power assist apparatus, such as a single electric motor built-in unit, which is mounted on the power assisted bicycle.

2. Background

The power assist apparatus for such a power assisted bicycle is provided with a power composition unit that compounds footpedal-propelling power exerted on a crank shaft and the assisting power of the motor and then transmits the composition power to a driven wheel. Conventionally widely known and available as a power composition unit are a planetary gear mechanism, a differential mechanism or the like.

When the power composition unit compounds the footpedal-propelling power and the assisting power, the output of the motor is controlled to maintain a good cycling feel of the power assisted bicycle by keeping an assist ratio, namely, the ratio of the assist power to the footpedal-propelling power, at a constant, preferably at an assist ratio of 1:1, and by keeping the feel of footpedals natural. At that time, care must be taken so that the assisting power may not exceed the footpedal-propelling power in any event.

The output of the electric motor in the prior art is continuously controlled to an assist ratio of 1:1 by sensing the footpedal-propelling power with dedicated sensor means (a torque sensor or the like), inputting the signal from the sensor means to control means (a small-scale CPU or the like), and allowing the control means to set an electric current allowed to flow through the electric motor in response to the footpedal-propelling power.

The accuracy of the sensor means for sensing footpedal-propelling power, the output characteristic of the electric motor responsive to the electric currents, the friction loss in the power composition unit and the like suffer from small variations from unit to unit, and such small variations, if accumulated, may be sufficient enough to vary the assist ratio.

In order to set the assist ratio accurately to 1:1, the accuracy of the sensor means of footpedal-propelling power, the output characteristic of the electric motor, the friction loss of the power composition unit and the like should be individually and precisely checked, and then the output power of the electric motor should be again checked after these components are assembled. Such an assembling method substantially pushes up the production cost of the power assist apparatus while lowering manufacturing efficiency.

Even if the assist rate of 1:1 is once obtained on a newly produced bicycle with its battery correctly charged, the bicycle will not necessarily continuously stick to that assist rate thereafter. The assist power is expected to exceed the footpedal-propelling power when a battery, if overcharged, increases the output power of the electric motor or when a friction loss in the power composition unit, if lowered after running in, relatively increases the output power of the electric motor.

When the assist power exceeds the footpedal-propelling power, not only the feel of cycling on the power assisting power will be rendered unnatural, but also a cyclist will encounter an unexpected acceleration. In order to avoid such a situation, the output power of the electric motor is set beforehand to be relatively lower, and thus, the assisting power will not go above the footpedal-propelling power even when the battery is overcharged or even when the friction loss in the power composition unit is lessened.

If the output power of the electric motor is set to be lower in preparation for an overcharged battery or a lowered friction loss in the power composition unit, it turns out that the electric motor output is too low with a battery correctly charged or on a new bicycle with a large friction loss in its power composition unit. As a result, the assist ratio of 1:1 cannot be maintained. At a time when the battery voltage drops, the output power of the electric motor falls, lowering further the assist ratio.

In addition to the above problem, the power composition unit in the prior art power assist apparatus is expensive and complicated in structure with its planetary gear mechanism or differential mechanism. The design of the power assist apparatus is thus bulky and heavy and involves a high manufacturing cost.

The above power assist apparatus is designed so that the power assisted bicycle can be driven only by the footpedal-propelling power without being driven by the electric motor. The reduction unit that connects the electric motor to the power composition unit is provided with footpedal-propelling power disengagement means such as a one-way clutch, wherein consideration is given to preventing the electric motor from being back-driven by the footpedal-propelling power in an unassisted cycling mode.

Since, in the prior art assist apparatus, the footpedal-propelling power disengagement means is arranged between the electric motor and the reduction unit, the entire reduction unit is back-driven when the crank shaft rotates in the unassisted cycling mode, and the footpedals thus need more power than actually needed for cycling.

The footpedal-propelling power disengagement means, if employed, enlarges the transverse dimension of the power assist apparatus, increasing the distance between the left and right footpedals and presents a difficulty in the cyclist's pedalling motion. Furthermore, a reverse rotational means for allowing the crank shaft to rotate in a reverse direction should be provided separately from the footpedal-propelling power disengagement means. This increases the number of components or parts and increases difficulty in manufacture.

In many cases, the casing that constitutes the enclosure of the power assist apparatus housing the electric motor, the power composition unit, the reduction unit and the like is made up of split structures, and a plurality of casing members are fastened together with numerous bolts or the like. The power assist apparatus thus has numerous bolts whose heads are exposed out of the side surfaces of the power assist apparatus. Bolt heads exposed out of the side surfaces of the power assist apparatus not only destroy the aesthetical appearance thereof, but also one likely to catch the extremities and clothing of the pedaling cyclist.

In order to enhance the operational efficiency of the electric motor, the casing preferably houses the electric motor in a manner that the structure of the electric motor is partially open to the outside, to positively cool the electric motor by exposing the electric motor to the wind coming in from ahead during cycling. In such an arrangement, however, bolts that secure the electric motor are also exposed out of the side surfaces of the casing, and the above described problem is more noticeable. For this reason, in many cases, the electric motor is sealed inside the casing and this presents a problem with the cooling of the electric motor.

The prior art casing structure needs dedicated locking members that secure the electric motor, and the quantity of the locking members is large enough to degrade the ease of assembly. This leads to the increasing of weight of the power assist apparatus and also increasing costs.

SUMMARY OF THE INVENTION

The present invention has been developed with a view to resolving the above problems, and it is a first object of the present invention to provide a power assist apparatus of a power assisted bicycle, which comprises a power composition unit having a simple, compact and light-weight structure and is capable of controlling precisely an assist ratio of an electric motor to a constant ratio with which the assist ratio is set to a desired ratio.

It is a second object of the present invention to provide a power assist apparatus of a power assisted bicycle, wherein a required footpedal-propelling power during unassisted cycling is decreased, a footpedal-propelling power disengagement means for an electric motor and a reverse rotational means of a crank shaft are mounted without enlarging the transverse dimension of the power assist apparatus, and the power assist apparatus can be easily manufactured by reducing the numbers of components or parts.

It is a third object of the present invention to provide a power assist apparatus of a power assisted bicycle, wherein a casing of the power assist apparatus has smooth side surfaces to enhance the aesthetic appearance of the casing and to prevent the casing from catching the extremities and clothing of a cyclist, the cooling effect to the electric motor sealed in the casing is improved, and the quantity of locking members is reduced to ensure the ease of assembly of the power assist apparatus, to implement a light-weight structure and to reduce the manufacturing cost.

These and other objects of the present invention can be achieved according to the present invention by providing, in one aspect, a power assist apparatus of a power assisted bicycle comprising:

- a crank shaft extending in a transverse direction of a body of a bicycle and rotatably driven by a footpedal-propelling power;
- an electric motor mounted to the body of the bicycle for generating an assist power;
- a power composition shaft rotatably supported and extending in parallel with the crank shaft;
- a footpedal-propelling power transmission mechanism for transmitting the footpedal-propelling power to the power composition shaft at a right angle to an axis of the power composition shaft;
- an assist power transmission mechanism for transmitting the assist power to the power composition shaft at a right angle to the axis of the power composition shaft in a direction opposite to a direction in which the footpedal-propelling power is transmitted;
- a power composition output mechanism for outputting a rotating power of the power composition shaft to a driven wheel;
- a moment sensor means for sensing a moment difference between two moments acting on the power composition shaft from two opposite directions when the footpedal-propelling power and the assist power are transmitted; and
- a control means for calculating an assist ratio of the assist power to the footpedal-propelling power based on magnitude and direction of a moment difference coming in from the moment sensor means and controlling an output of the electric motor so that the assist ratio is kept at a constant ratio.

In preferred embodiment, the positional relationship of the footpedal-propelling power transmission mechanism, the assist power transmission mechanism and the power composition output mechanism relative to the power composition shaft are set up such that the assist ratio is set to be a predetermined value when the moment difference is zero.

The moment sensor means has a structure for picking up the moment difference acting on the power composition shaft by measuring a load added on one end of the power composition shaft.

The power assist apparatus may further comprise a reduction unit for reducing the rotational speed of the electric motor and a footpedal-propelling power disengagement means which disengages the electric motor from the footpedal-propelling power during unassisted cycling, the footpedal-propelling power disengagement means being disposed on the power composition shaft. The footpedal-propelling power transmission mechanism is disposed between the assist power transmission mechanism and the power composition output mechanism in the transverse direction of the bicycle body and the footpedal-propelling power disengagement means is disposed between the footpedal-propelling power transmission mechanism and the assist power transmission mechanism.

The power assist apparatus may further comprise, on the crank shaft, a reverse rotational means which enables the crank shaft to rotate in a reverse direction, the reverse rotational means being disposed to the side of the assist power transmission mechanism relative to the footpedal-propelling power transmission mechanism.

In another aspect, there is provided a power assist apparatus of a power assisted bicycle comprising a casing which houses a crank shaft rotatably driven by a footpedal-propelling power, an electric motor for generating an assist power and a power composition unit for compounding the footpedal-propelling power and the assist power and outputting the compounded power to a driven wheel side, the casing comprising a center case disposed at a central portion thereof transversely across the bicycle body, a side case secured to a left-hand side of the center case, and a side case secured to a right-hand side of the center case, the leftside case being secured with locking members inserted from the right-hand side of the center case and the left side case being secured with locking members are inserted from the left-hand side of the center case.

The electric motor is disposed between the center case and the side case, and the locking members which secure the side case to the center case secure together the electric motor to the center case.

According to the first aspect of the present invention, the footpedal-propelling power from the crank shaft is transmitted to the power composition shaft via the footpedal-propelling power transmission mechanism, while the assist power of the electric motor is transmitted to the power composition shaft via the assist power transmission mechanism. The power composition shaft is thus driven. The rotating power of the power composition shaft is a compound power of the footpedal-propelling power and the assist power, and the compound power is outputted through the power composition output mechanism to the driven wheel to drive it. The footpedal-propelling power transmission mechanism and the assist power transmission mechanism transmit respectively the footpedal-propelling power and the assist power to the power composition shaft at a right angle to the axis of the power composition shaft but from two diagonally opposite directions of the power composition shaft.

The moment sensor means picks up two directional forces acting on the power composition shaft, as moments, and feeds to the control means the difference between two directional moments. The control means calculates the assist ratio of the assist power to the footpedal-propelling power based on the magnitude and direction of the moment difference and controls the output of the electric motor so that the assist ratio is kept at a constant ratio.

In the assist apparatus thus constructed, the assist ratio of the assist power is accurately determined without error by picking up the difference between two moments acting on the power composition shaft in two different directions. Dispensed with is sensor means for the footpedal-propelling power, which is employed in the prior art power assist apparatus, in which the footpedal-propelling power acting on the crank shaft is once detected, and the output of the electric motor is controlled to match with the detected footpedal-propelling power.

There is no need for taking into consideration the error that could be introduced by the footpedal-propelling power sensor means, if employed. Since the net output power of the electric motor is factored in the determination of the assist ratio, the effect of variations in the output characteristic of the electric motor, charge conditions of the battery, and friction loss changes in the power composition unit between before and after a running in operation on the assist ratio can be completely neglected, and hence, the assist ratio can be controlled continuously and precisely to a constant ratio.

The control means controls the electric motor so that the moment difference between two moments from two different directions acting on the power composition shaft through the transmissions of the footpedal-propelling power and the assist power is constantly kept at zero, and in such a condition, the assist ratio is set to be a desired ratio (1:1 for example). The control of the output of the electric motor is simple. The electric motor is controlled such that the moment difference on the power composition shaft is kept to zero. The assist ratio of the assist power is thus easily controlled to the desired ratio.

The moment difference acting on the power composition shaft is detected by simply measuring the load added on one end of the power composition shaft. The moment sensor means is thus of a particularly simple structure and picks up the moment difference acting on the power composition shaft with a high accuracy.

When the crank shaft rotates during the unassisted cycling, the electric motor is disengaged from the footpedal-propelling power by means of the footpedal-propelling power disengagement means disposed on the power composition shaft, and the electric motor is hence prevented from being back-driven.

Since the footpedal-propelling power disengagement means disposed on the power composition shaft is arranged downstream side (driven side) of the reduction unit of the electric motor and the assist power transmission mechanism, the footpedal-propelling power disengagement means does not transmit the rotating power of the power composition shaft to the reduction unit and the assist power transmission mechanism during the unassisted cycling. When the crank shaft rotates during the unassisted cycling, the reduction unit and the assist power transmission mechanism stay free from back-driving, and the footpedal-propelling power required is thus substantially reduced during the unassisted cycling.

The footpedal-propelling power disengagement means is disposed in the widest span available between the footpedal-propelling power transmission mechanism, the assist power transmission mechanism and the power composition output mechanism, and hence, the footpedal propelling power disengagement means can be mounted without widening the width across the power assist apparatus.

The footpedal-propelling power disengagement means on the power composition shaft and the reverse rotational means on the crank shaft are aligned in the fore-and-aft direction in the power assist apparatus, and hence, the reverse rotational means can be mounted without widening the width of the power assist apparatus.

Furthermore, since the slowdown direction of the footpedal-propelling power disengagement means with respect to the assist power transmission mechanism accords with the slowdown direction of the reverse rotational means with respect to the footpedal-propelling power transmission mechanism, the footpedal-propelling power disengagement means and the reverse rotational means can be standardized to an identical design, thereby reducing the component number of the power assist apparatus and simplifying the manufacturing process.

According to the another aspect of the present invention, both the side cases are secured to the center case with the locking members, and thus the locking members are not exposed out of the side cases, and the appearance of the side case surfaces is aesthetically improved.

The locking seats formed on the electric motor are sandwiched between the center case and the side case in a firm contact engagement, the heat of the electric motor escapes to the casing and cooling capability of the electric motor is thus improved. Since the locking members that secure the side case to the center case are shared with the electric motor to secure it, the quantity of the locking members is reduced. This simplifies the manufacturing and reduces the weight and cost of the apparatus.

BRIEF DESCRIPTION OF THE DRAWINGS

A preferred embodiment of the present invention will be made more clear through the following description with reference to the accompanying drawings, in which.

DESCRIPTION OF THE PREFERRED EMBODIMENT

Figure 1:
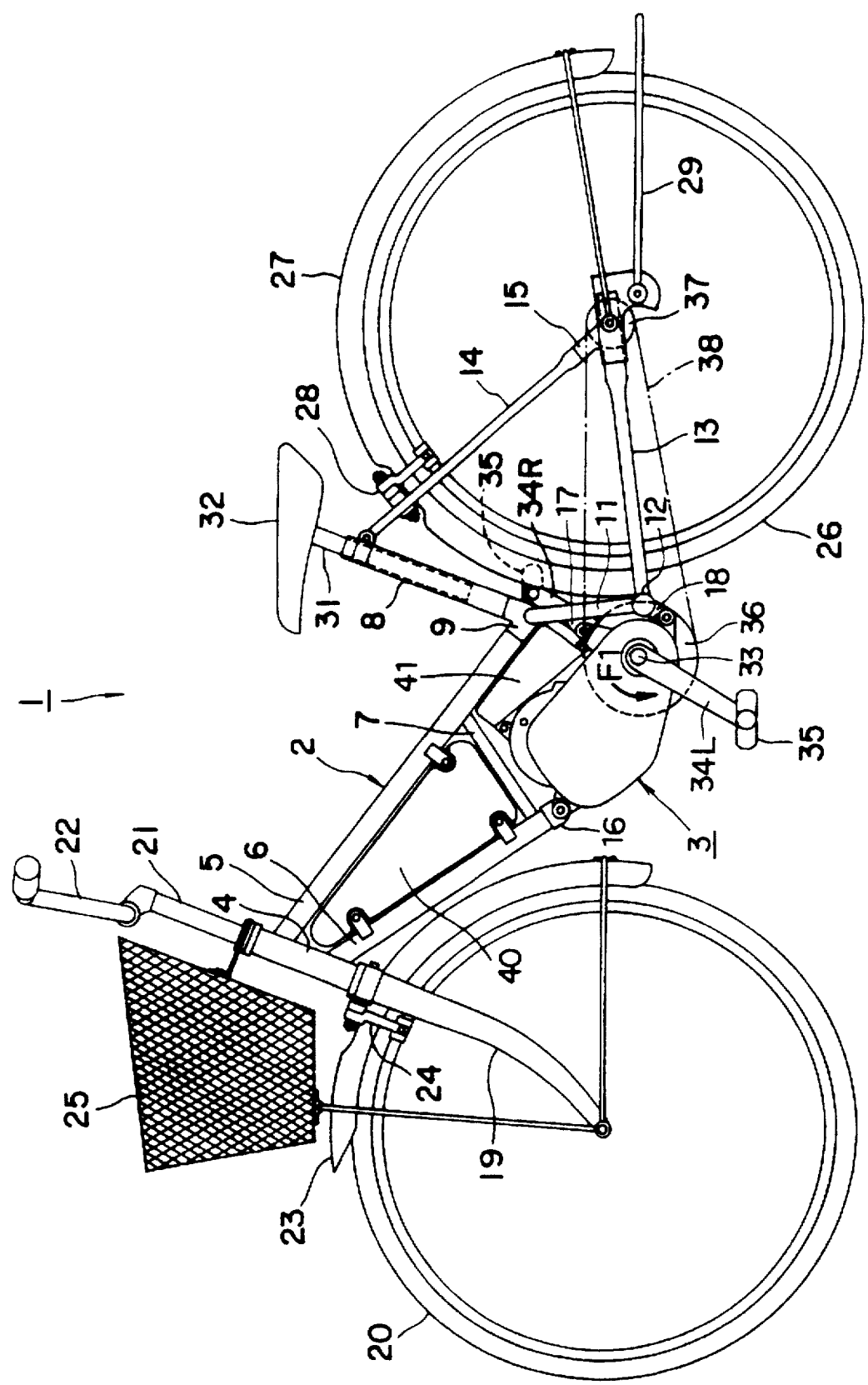
FIG. 1 is a left-side view of a power assisted bicycle provided with a power assist apparatus according to the present invention.

Referring now to the drawings, one preferred embodiment of the present invention is discussed. FIG. 1 is the left-side view of a power assisted bicycle provided with a power assist apparatus of the present invention. The power assisted bicycle 1 is constructed of a body frame 2 made of metal piping and a power assist apparatus 3 is mounted on the lower portion of the body frame 2.

The body frame 2 has on its front end portion a head pipe 4, from which both an upper tube 5 and a lower tube 6 are extended rearward at an angle. The upper tube 5 at its middle portion is connected to the lower tube 6 at its rear end by a bridge member 7, and the rear end of the upper tube 5 is connected via a seat lug 9 to the lower end of a seat tube 8 that extends upward at a steep angle.

A pair of left and right joint tubes 11 extend downward from the seat lug 9, and the lower end portions of the joint tubes 11 are widely apart leftward and rightward and connected to pipe-like chain lugs 12 that extend transversely across the bicycle. A pair of left and right chain stays 13 extend rearward from the chain lugs 12.

A pair of left and right seat stays 14 extend rearward at an angle from the seat tube 8 near its top end, and the lower ends of the seat stays 14 are connected to the rear ends of the chain stays 13 via rear ends 15.

Mounting brackets 16, 17 and 18 are respectively secured to the rear end of the lower tube 6, the middle portions of the joint tubes 11 and the bottom sides of the chain lugs 12. The power assist apparatus 3 is bolted to the brackets 16, 17, and 18. In this arrangement, the rear end of the lower tube 6 is connected to the chain lugs 12 through the power assist apparatus 3, and thus, the power assist apparatus 3 constitutes a part of the body frame 2.

A front fork 19 is supported by the head pipe 4 in a manner that the front fork 19 rotates clockwise or counter-clockwise for steering, and a front wheel 20 is supported at the lower ends of the front fork 19. Mounted on the top of the front fork 19 is a handle post 21 to which a handle bar 22 is attached. The front fork 19 is provided with a front fender 23 which partly covers the front wheel 20, a front brake 24 for braking the front wheel, a basket 24 for carrying a load and the like, all of which are rotated integrally with the front fork 19.

A rear wheel 26 is rotatably supported by the rear ends 15 disposed at the rear end of the body frame 2, and a rear fender 27 which covers the rear wheel 26 is supported by the chain stays 13, the seat stays 14 and the rear ends 15. A rear brake 28 for braking the rear wheel is mounted on the seat stays 14. The rear ends 15 are provided with a stand device 29 which keeps the bicycle in an upright position for parking.

A seat post 31 is inserted into the seat tube 8 from above and is fixed therein, and a saddle 32 is mounted on the top of the seat post 31. A crank shaft 33 extending transversely across the bicycle is rotatably supported at the power assist apparatus 3, a crank 34L and a crank 34R are secured to the respective ends of the crank shaft 33, and pedals 35 are rotatably supported at the ends of the respective cranks 34L, 34R.

A final drive sprocket 36 is attached to the crank shaft 33 on the right-hand side of the power assist apparatus 3, and a chain 38 is wrapped around the final drive sprocket 36 and a final driven sprocket 37 attached to the rear wheel 26.

The crank shaft 33 is rotatably driven forward in the direction of the arrow F1 when a cyclist sitting on the saddle 32 treadles the pedals 35, and the final drive sprocket 36 rotates in the same direction as the crank shaft 33, and this rotational motion is transmitted to the final driven sprocket 37 via the chain 38 driving the rear wheel 26.

A battery unit 40 for driving the electric motor housed in the power assist apparatus 3 is secured between the upper tube 5 and the lower tube 6 in the body frame 2. The battery unit 40 is, for example, constructed of a synthetic resin case unit 40 into which a plurality of small batteries and a charger are sealed. Disposed on top of the power assist apparatus 3 is a control unit 41 for controlling the output of the electric motor.

Figure 2:
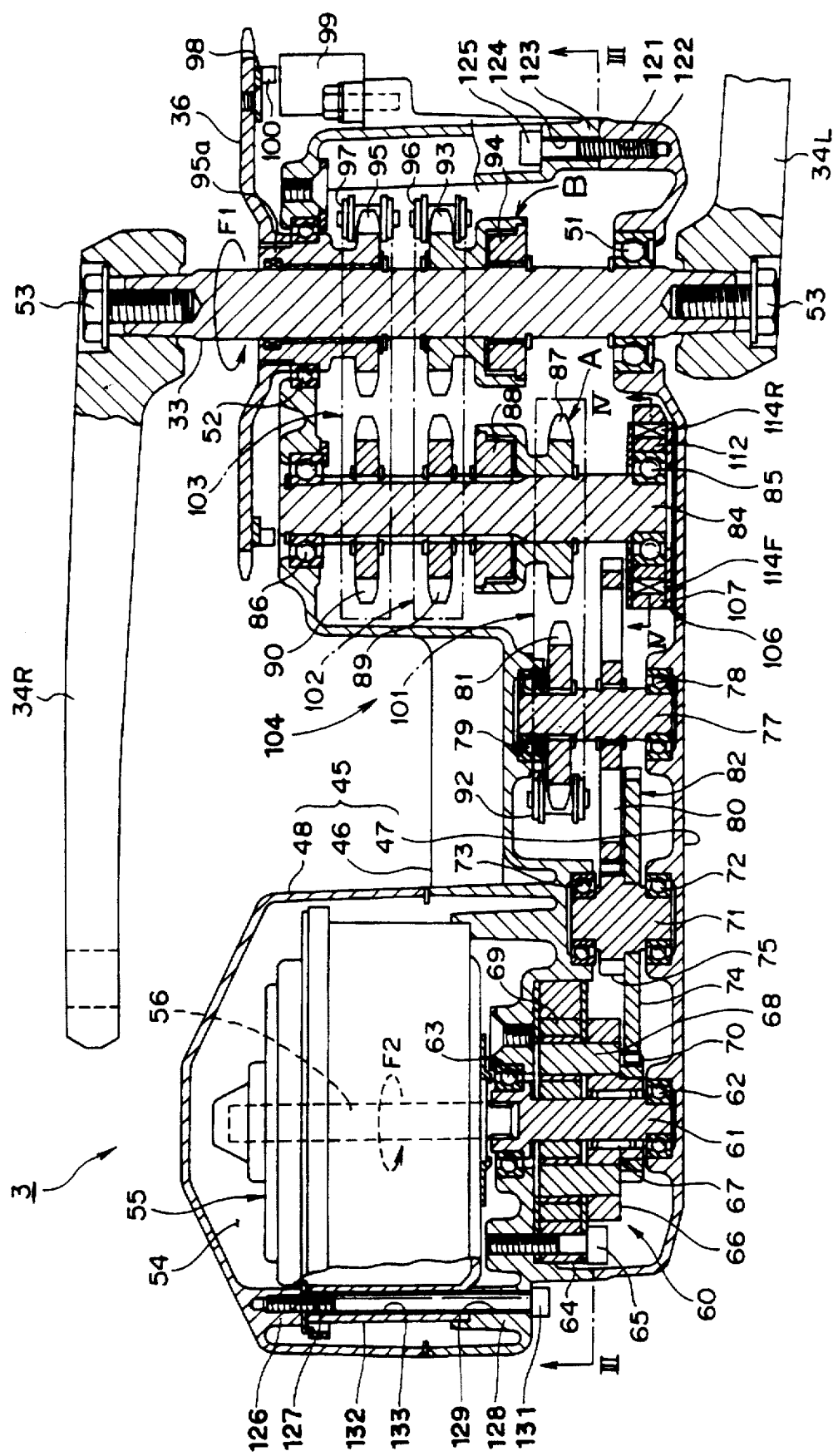
FIG. 2 is a horizontal sectional view of the power assist apparatus according to one embodiment of the present invention.
Figure 3:
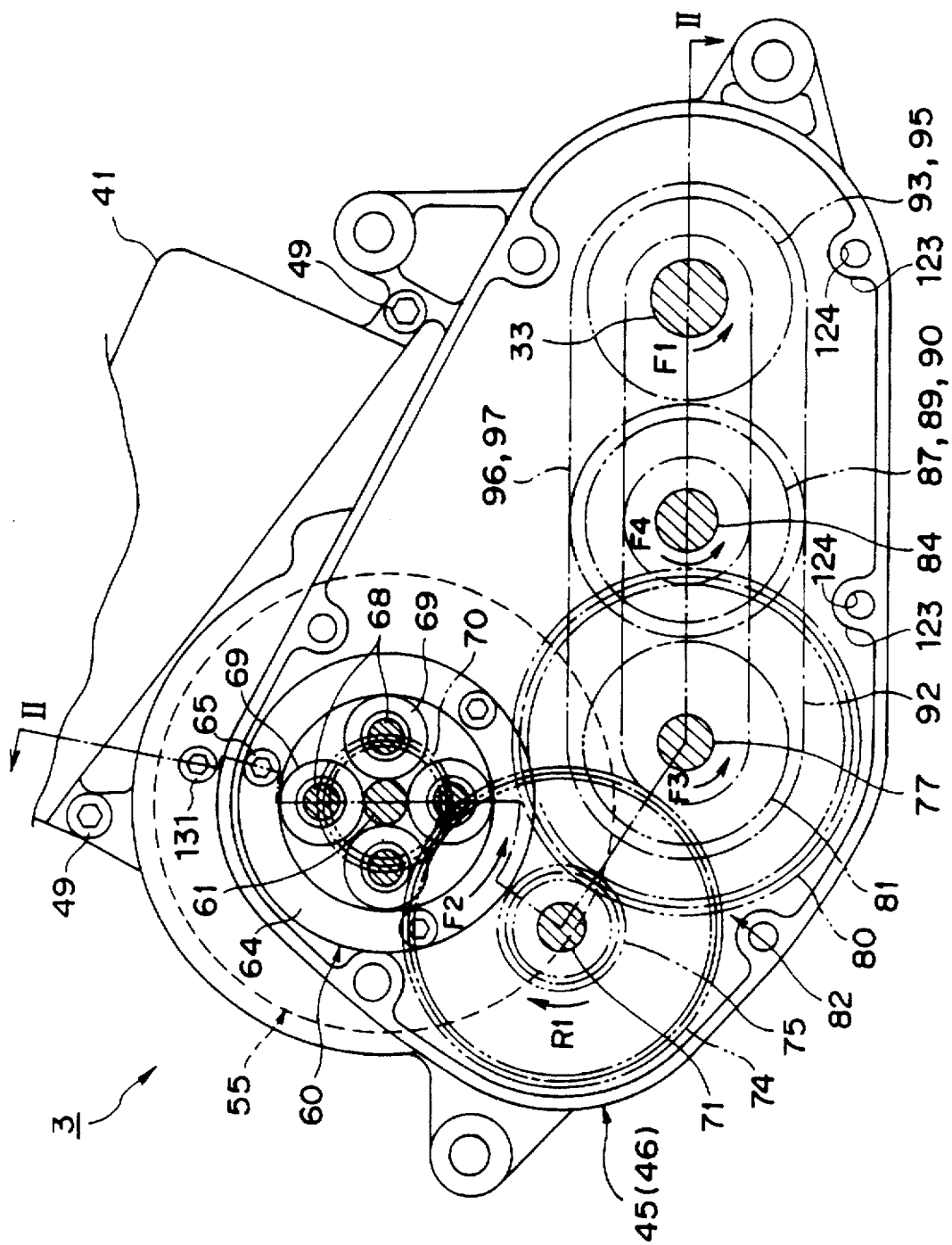
FIG. 3 is a cross-sectional view of the left-hand side of the power assist apparatus, taken along the line III—III in FIG. 2.

FIG. 2 is the cross-sectional view of the power assist apparatus 3 according to the embodiment of the present invention. FIG. 3 is the cross-sectional view of the left-hand side of the power assist apparatus 3, taken along the line III—III in FIG. 2. FIG. 2 is the view developed along the line II—II in FIG. 3.

A casing 45 constituting the enclosure of the power assist apparatus 3 is made of a center case 46 positioned at the center transversely across the bicycle as shown in FIG. 2, a side case 47 secured to the entire left-hand side of the center case 46, and a side case 48 that is secured to the right-hand front-top portion of the center case 46. The control unit 41 is attached to the center case 46 with two bolts 49. FIG. 3 shows the power assist apparatus 3 with the side case 47 removed.

The crank shaft 33 is rotatably supported at bearings 51, 52 in the rear portion of the casing 45, and the cranks 34L, 34R are bolted to both ends of the crank shaft 33 projected leftward and rightward out of the casing 45.

An electric motor chamber 54 is formed between the center case 46 and the side case 48 in the casing 45, and the electric motor 55 is housed in the chamber 54. The electric motor 55 generates assist power and its main shaft 56 is arranged in parallel with the crank shaft 33.

A roller-type planetary reduction mechanism 60 is disposed to the left of the electric motor 55. The sun roller 61 of the planetary reduction mechanism 60 has an axial configuration, with its left end supported at a bearing 62 fitted in the side case 47 and with its right end supported at a bearing 63 fitted in the center case 46. The sun roller 61 is spline-engaged with the left end of the main shaft 56 of the electric motor 55 so that they rotate in an integral motion.

A ring roller 64 is secured to the center case 46 with bolts 65 and disposed to the left of the ring roller 64 is a reduction carrier 66 in a manner that it freely revolves around the sun roller 61 via a bearing 67. The reduction carrier 66 is provided with four roller shafts 68 which are in parallel with the sun roller 61, and the roller shafts 68 rotatably support their respective planetary rollers 69. The circumferences of the four planetary rollers 69 remain in contact with the inner circumference of the ring roller 64 and the outer circumference of the sun roller 61. A primary drive gear 70 is provided on the left end face of the reduction carrier 66 to be rotated together.

When the main shaft 56 of the electric motor 55 rotates, the sun roller 61 of the planetary reduction mechanism 60 rotates integrally with it, and each planetary roller 69 spins between the fixed ring roller 64 and the sun roller 61 while revolving around the sun roller 61, thereby rotatably driving the reduction carrier 66 and the primary drive gear 70 in reduced speed. As shown, both the main shaft 56 and the sun roller 61 spin forward in the direction of the arrow F2, and both the reduction carrier 66 and the primary drive gear 70 spin in the same direction as well.

In this embodiment, the planetary reduction mechanism 60 is of a roller type. Alternatively, the planetary reduction mechanism 60 may be constructed of a gear type, in which the peripheral portion of the sun roller 61 is formed as a pinion, the ring roller 64 is a ring gear (internal gear), and each planetary roller 69 is a planetary gear which is meshed with the pinion gear and the ring gear.

A reduction shaft 71 is rotatably supported at bearings 72, 73 angled forward below the sun roller 61. The axial center line of the reduction gear 71 extends in parallel with the crank shaft 33. Supported on the reduction shaft 71 are a first large-diameter driven gear 74 in mesh with the primary drive gear 70 and a secondary small-diameter drive gear 75 disposed inside the first driven gear 74 in a manner that the reduction shaft 71 spins in integral rotation with both the gears 74 and 75. The reduction shaft 71, the primary driven gear 74 and the secondary drive gear 75 spin backward in the direction of the arrow R1 as shown in FIG. 3.

Disposed at a rearward angle below the reduction shaft 71 is an intermediate shaft 77 rotatably supported at bearings 78, 79. The intermediate shaft 77 also extends in parallel with the crank shaft 33. Supported by the intermediate shaft 77 are a secondary large-diameter driven gear 80 in mesh with the secondary drive gear 75 on the reduction shaft 71 and an assist power drive sprocket 81 disposed inside the secondary driven gear 80 in a manner that the intermediate shaft 77 spins integrally with both the secondary driven gear 80 and the assist power drive sprocket 81. The intermediate shaft 77 spins forward in the direction of the arrow F3.

A reduction gear train 82 is made up of the above described gears 70, 74, 75 and 80. The reduction gear train 82 along with the planetary reduction mechanism 60 constitutes a reduction unit which reduces the rotational speed of the electric motor 55.

A power shaft 84 is arranged between the crank shaft 33 and the intermediate shaft 77 in parallel with both the shafts 33, 77. This power shaft 84 is for outputting a compound power from the crank shaft 33 for footpedal power and the intermediate shaft 33 for electric motor power. Therefore, shaft 84 is referred to as the power composition shaft 84 hereinafter. The power composition shaft 84 is rotatably supported at bearings 85, 86. Supported by the power composition shaft 84 are an assist power driven sprocket 87 along with a one-way clutch 88 on the left of shaft 84, a footpedal-propelling power driven sprocket 89 in an integrally rotatable manner on the middle of shaft 84, and a power composition drive sprocket 90 in an integrally rotatable manner on the right of shaft 84. As shown in FIG. 3, the intermediate shaft 77, the power composition shaft 84 and the crank shaft 33 are aligned in a line in the fore-and-after direction if viewed from the side as in FIG. 3.

A chain 92 is wrapped around the assist power drive sprocket 81 and the assist power driven sprocket 87. The assist driven sprocket 87 spins forward in the direction of the arrow F4. The one-way clutch 88 transmits rotating power of the assist power driven sprocket 87 to the power composition shaft 84 and disengages the assist power driven sprocket 87 from the power composition shaft 84 when the rotational speed of the power composition shaft 84 exceeds that of the assist power driven sprocket 87, causing the power composition shaft 84 to idle relative to the assist power driven sprocket 87.

The crank shaft 33 supports on its middle portion a footpedal-propelling power drive sprocket 93 along with a one-way clutch 94, and the crank shaft 33 rotatably supports to its right side a power composition driven sprocket 95. A chain 96 is wrapped around the footpedal-propelling power driven sprocket 89 and the footpedal-propelling power drive sprocket 93, and a chain 97 is wrapped around the power composition drive sprocket 90 and the power composition driven sprocket 95.

The one-way clutch 94 transmits the rotation of the crank shaft 33 in the direction of F1 to the footpedal-propelling power drive sprocket 93. When the rotational speed of the footpedal-propelling sprocket 93 exceeds that of the crank shaft 33 or when the crank shaft 33 spins in the reverse direction the one-way clutch 94 disengages the footpedal-propelling power drive sprocket 93 from the crank shaft 33, causing the footpedal-propelling power drive sprocket 93 to idle relative to the crank shaft 33.

A boss 95a rightward projected out of the casing 45 is integrally formed with the power composition driven sprocket 95, and the final drive sprocket 36 is mounted to the boss 95a integrally rotatably therewith. A ring-like sensor plate 98 is attached to the inside surface (left-side surface as viewed) of the final drive sprocket 36 integrally rotatably therewith, while a speed sensor 99 is mounted on the casing 45. The speed sensor 99 detects the rotational speed of the final drive sprocket 36, namely the speed of the bicycle, by picking up the movement of projections 100 which are equally spaced around the entire periphery of the sensor plate 98.

The assist power drive sprocket 81, the assist power driven sprocket 87 and the chain 92 constitute an assist power transmission mechanism 101. The footpedal-propelling power driven sprocket 89, the footpedal-propelling power drive sprocket 93 and the chain 96 constitute a footpedal-propelling power transmission mechanism 102. The power composition drive sprocket 90, the power composition driven sprocket 95, the chain 97 and the final drive sprocket 36 constitute a power composition output mechanism 103.

A power composition unit 104 is constituted of the assist power transmission mechanism 101, the footpedal-propelling power transmission mechanism 102, the power composition output mechanism 103, the intermediate shaft 77, the power composition shaft 84 and the like. In this embodiment, the numbers of teeth of the sprockets 81, 87, 89, 90, 93 and 95 are set to be equal to each other.

When the power assisted bicycle 1 is used, the assist power of the electric motor 55 is reduced in speed by the planetary reduction mechanism 60 and the reduction gear train 82 and is then transmitted to the power composition shaft 84 via the assist power transmission mechanism 101. The footpedal-propelling power acting on the crank shaft 33 is transmitted to the power composition shaft 84 via the footpedal-propelling power transmission mechanism 102. The rotating power of the power composition shaft 84 is a power composed of the assist power and the footpedal-propelling power, and the compounded power is transmitted to the rear wheel 26 as a driven wheel via the power composition output mechanism 103. In this arrangement, a small footpedal-propelling power is enough to drive the power assisted bicycle 1.

Since the assist power transmission mechanism 101 and the footpedal-propelling power transmission mechanism 102 constitute a transmission mechanism of wrap engagement using the chains 92, 96, the assist power and the footpedal-propelling power are transmitted to the power composition shaft 84 at a right angle to the power composition shaft 84. The power composition shaft 84 is placed between both the transmission mechanisms 101, 102 with both mechanisms 101, 102 at diagonally opposite sides of the power composition shaft 84. Thus, the assist power and the footpedal-propelling power are applied to the power composition shaft 84 in two opposing directions.

In this arrangement, the assist power and the footpedal-propelling power are transmitted, the power composition shaft 84 is pulled from two opposing directions (fore-and-aft directions). When the assist power only is transmitted, the power composition shaft 84 is pulled forward and when the footpedal-propelling power only is transmitted, the power composition shaft 84 is pulled backward.

Moment sensor means 106 is provided herein for detecting tensile strengths acting on the power composition shaft 84 in the fore-and-aft directions as a moment acting on the power composition shaft 84. The moment sensor means 106 is mounted on the bearing 85 which supports the left end of the power composition shaft 84.

Figure 4:
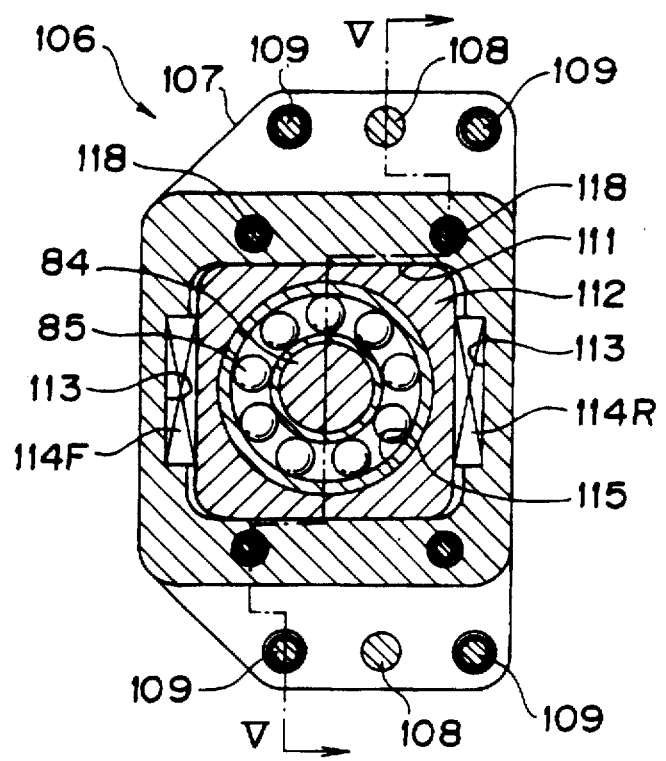
FIG. 4 is an enlarged, vertical sectional view of a moment sensor means, taken along the line IV—IV in FIG. 2.
Figure 5:
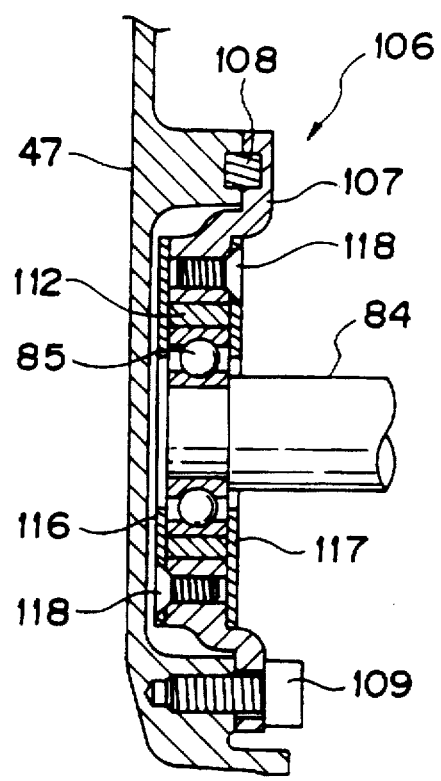
FIG. 5 is an enlarged vertical sectional view of the moment sensor means, taken along the line V—V in FIG. 4.

FIGS. 4 and 5 are enlarged, vertical sectional views showing the moment sensor means 106. The moment sensor means 106 is constructed, for example, in the following manner.

A slider housing 107 is secured to the inside of the side case 47. The slider housing 107 is accurately positioned by two knock-pins 108, one on the top and the other on the bottom side of the housing 107 and is secured at its four corners to the side case 47 with four bolts 109.

The slider housing 107 is provided with a square-shaped, slider opening 111, into which the slider block 112 is fitted with no vertical looseness relative to the slider opening 111, but with a freedom of slight displacement in the fore-and-aft directions relative to the slider opening 111.

The slider opening 111 has notches 113 on its front side and rear side, and load sensors 114F and 114R are received within the respective notches 113. Since these front and rear load sensors 114F, 114R abut against the slider block 112, it is prevented from being loosen in the fore-and-aft directions.

The bearing 85 which supports the left end of the power composition shaft 84 is tightly fitted in a round hole 115 formed in the slider block 112. Two thrust plates 116, 117 are attached to both the sides of the slider housing 107 in a sandwich fashion, with one plate 116 to one side of the slider housing 107 with four screws 118 and the other plate 117 to the other side of the slider housing 107 with four screws 118. These thrust plates 116, 117 restrict the transverse movement of the slider block 112 and the load sensors 114F, 114R.

Figure 6:
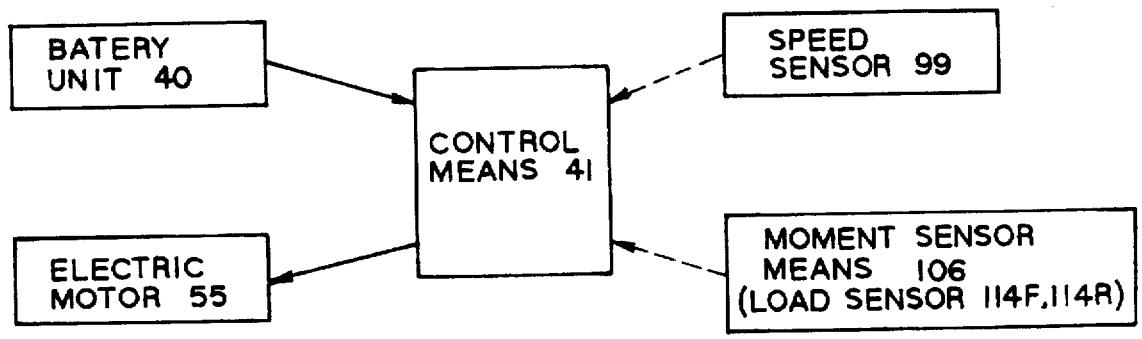
FIG. 6 is a block diagram showing a control system of the power assisted bicycle.

The load sensors 114F, 114R of the moment sensor means 106 thus constructed are electrically connected to the control means 41 as shown in FIG. 6, and the load value measured by the load sensors 114F, 114R is fed to the control means 41. Also connected to the control means 41 are the battery unit 40, the electric motor 55 and the speed sensor 99.

When the assist power and the footpedal-propelling power are applied to the power composition shaft 84, the power composition shaft 84 is pulled in the fore-and-aft directions as already described. In this case, although the bearing 86 blocks the fore-aft-movement of the power composition shaft 84 at its right end, the left end of the power composition shaft 84 is slightly displaceable integrally with the bearing 85 and the slider block 112 in the fore-and-aft directions. Thus, two kinds of moments are applied for pivoting forward and rearward the left end of the power composition shaft 84 about the bearing 86 at its right end as the axis of rotation.

According to the result from subtracting a smaller moment from a greater moment, namely to the moment difference therebetween, the left end of the power composition shaft 84 is pressed forward or rearward with the bearing 85 and the slider block 112 to thereby exert a compressive load to the load sensor 114F or 114R between the slider block 112 and the slider opening 111. Therefore, the load value measured by the load sensors 114F, 114R, as it is, represents the moment difference acting on the power composition shaft 84.

The control means 41, constructed of a small-scale CPU, calculates the ratio of the assist power to the footpedal-propelling power, namely the assist ratio, based on the magnitude and direction of the moment difference measured by the moment sensor means 106, and then, in order to keep the assist ratio at a constant ratio, the control means 41 adjusts the voltage from the battery unit 40, applies it to the electric motor 55 and controls the output of the electric motor 55.

When the load applied to the front load sensor 114F increases, for example, the control means 41, determining that the assist ratio rises, decreases the output of the electric motor 55. Conversely, when the load applied to the rear load sensor 114R is increased, the control means 41 judges that the assist ratio drops and increases the output of the electric motor 55. The assist ratio is thus kept at a constant ratio.

The control means 41 determines the bicycle speed and the rotational status of the final drive sprocket 36 based on the signal from the speed sensor 99. When the bicycle speed exceeds a threshold, for example, the control means 41 suspends the feeding of electric power to the electric motor 55 so that the bicycle speed may not become excessively fast.

Since the assist ratio of the assist power is easily determined by picking up, by the moment sensor means 106, the moment difference between two moments from two different directions acting on the power composition shaft 84 with the footpedal-propelling power and the assist power applied, no pickup means for picking up the footpedal-propelling power is required unlike the prior art power assist apparatus. In the prior art power assist apparatus, the footpedal-propelling power applied to the crank shaft 33 is first measured, and then the output of the electric motor 55 is controlled in accordance with the measured footpedal-propelling power.

There is no need for taking into consideration the error that could be introduced by the footpedal-propelling power sensor means if used. Since the net output power of the electric motor is factored in the determination of the assist ratio, the effect on the assist ratio of variations in the output characteristic of the electric motor 55, charge conditions of the battery unit 40 and friction loss changes in each unit, between, before and after operations can be entirely neglected, and thereby the assist ratio is therefore controlled continuously and precisely to a constant ratio.

Furthermore, no labor is required for checking the accuracy of the footpedal-propelling power sensor means, the output characteristic of the electric motor 55, or the friction loss of each of the associated units on a total inspection basis. No labor is required for checking the output of the electric motor after a bicycle is fully assembled. Furthermore, since each of the assist power transmission mechanism 101, the foot pedal-propelling power transmission mechanism 102 and the power composition output mechanism 103, all together constituting the power composition unit 104, is of a simple structure, the ease of assembly of the power assist apparatus 3 can be substantially promoted while a compact and lightweight design is implemented.

Since the moment difference acting on the power composition shaft 84, namely, the assist ratio, is measured by simply picking up the load exerted on one end of the power composition shaft 84, the moment sensor means 106 is of a particularly simple structure, while the moment difference acting on the power composition shaft 84 is still accurately measured.

In the power assist apparatus 3, the positional relationship of the assist power transmission mechanism 101, the footpedal-propelling power transmission mechanism 102 and the power composition output mechanism 103 relative to the power composition shaft 84 is set up such that the assist ratio is set to be a desired ratio, for example, an ideal ratio of 1:1 when the moment difference acting on the power composition shaft 84 is zero, namely when the load measured by the load sensors 114F, 114R is zero.

Figure 7:
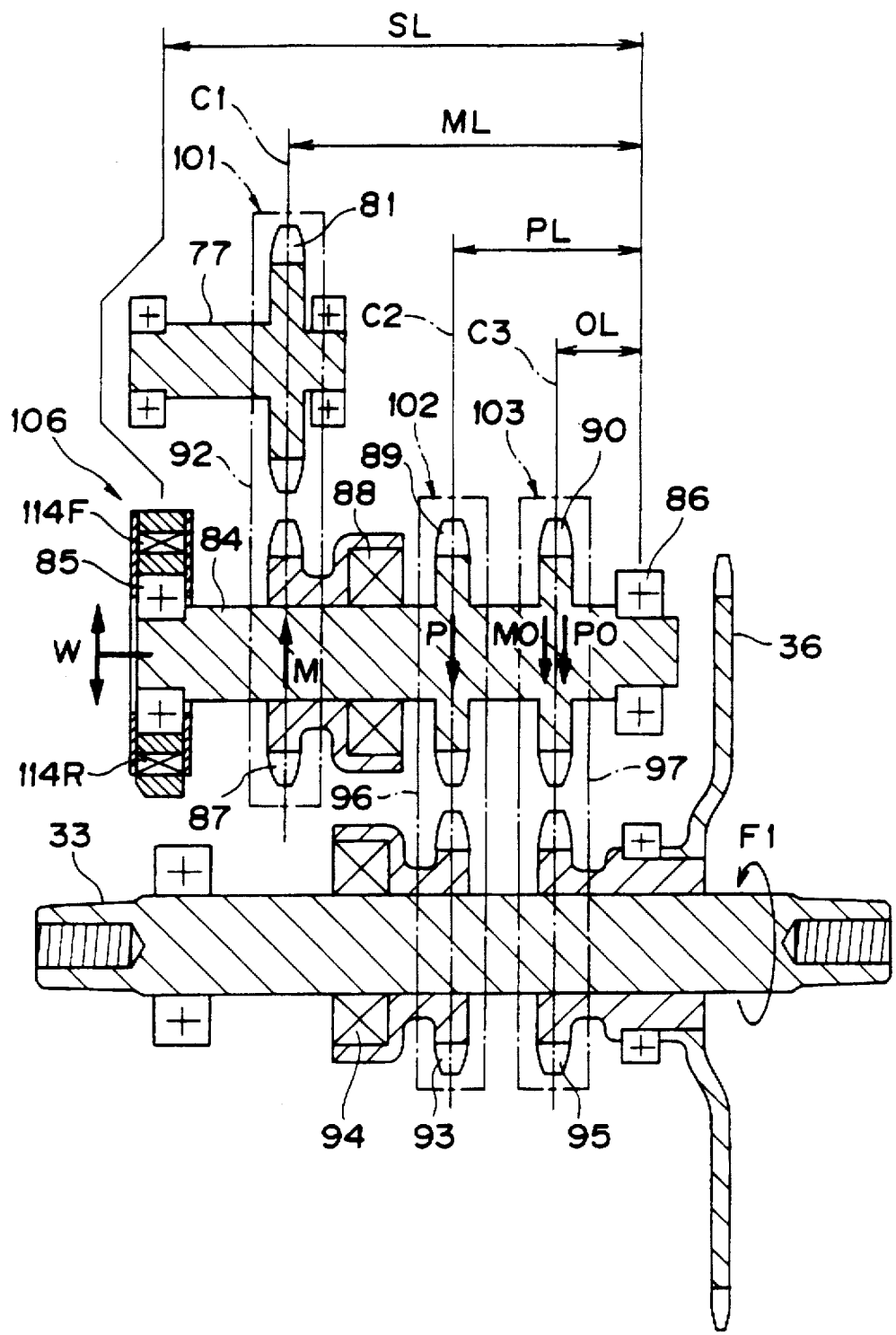
FIG. 7 is a plan view showing a positional relationship of a power composition shaft to an assist power transmission mechanism, a footpedal-propelling power transmission mechanism and a power composition output mechanism according to the power assist apparatus of the present invention.

FIG. 7 is the plan view showing the positional relationship of the assist power transmission mechanism 101, the footpedal-propelling power transmission mechanism 102, and the power composition output mechanism 103 relative to the power composition shaft 84. As shown, the distance between the bearings 85, 86, which support the power composition shaft 84 at its ends, is designated by a distance SL, and the center lines C1, C2 and C3 of the assist power transmission mechanism 101, the footpedal-propelling power transmission mechanism 102 and the power composition output mechanism 103 are positioned at respective distances ML, PL, and OL, relative to the right-hand bearing 86. In this embodiment, the position ML of the center line C1 of the assist power transmission mechanism 101 is set up as:

$$ML=PL+2OL$$

When the power composition shaft 84 is driven by the footpedal-propelling power only, the magnitude of the moments (moment difference) acting on the power composition shaft 84, namely, the product of the load value W measured by the load sensors 114F, 114R of the moment sensor means 106 and the distance SL between the bearings of the power composition shaft 84 is $$W{\times}SL=P{\times}PL+PO{\times}OL$$

where P is the tensile strength exerted on the chain 96 of the footpedal-propelling power transmission mechanism 102, and PO is the tensile strength exerted on the chain 97 exerted on the power composition output mechanism 103 when the footpedal-propelling power is applied. Since the numbers of teeth of the sprockets 89, 90, 93 and 95 are set to be equal, P=PO, the load value W is calculated as follows:

$$W=P(PL+OL)/SL$$

When the power composition shaft 84 is driven by both the assist power and the footpedal-propelling power combined, the magnitude of the moments, W×SL, acting on the power composition shaft 84 is expressed as follows:

$$W{\times}SL=P{\times}PL+PO{\times}OL-M{\times}ML+MO{\times}OL$$

where M is the tensile strength exerted on the chain 92 of the assist power transmission mechanism 101 and MO is the tensile strength exerted on the chain 97 of the power composition output mechanism 103 with the assist power applied. Since the numbers of the teeth of the sprockets 81, 87, 89, 90, 93, and 95 are set to be equal, P=PO, M=MO, the load value W is calculated as follows:

$$W=\{P(PL+OL)-M(ML-LO)\}/SL$$

When the assist ratio of the assist power is the ideal ratio of 1:1, P=M, and thus if P is substituted for M, $$W=P(PL-ML+2OL)/SL$$

If the position ML of the center line C1 of the assist power transmission mechanism 101 is set in this embodiment as follows, $$ML=PL+2OL$$

the assist ratio will be 1:1 when W=0.

In the above setting, the control means 41 can keep the assist ratio to the desired ratio of 1:1 by simply controlling the output of the electric motor 55 so that, when the footpedal-propelling power and the assist power are applied, the moment difference between two different moments from two different directions acting on the power composition shaft 84 is zero, namely, the load W measured by the load sensors 114F, 114R of the moment sensor means 106 is zero. Thus, a good cycling feel results from the power assisted bicycle 1.

In this embodiment, the assist power transmission mechanism 101, the footpedal-propelling power transmission mechanism 102 and the power composition output mechanism 103 are constructed of a transmission mechanism of wrap engagement using a chain. Alternatively, they are constructed of a gear transmission mechanism. In this case, however, it is required that both the assist power and the footpedal-propelling power are applied to the power composition shaft 84 at a right angle to the axis of the power composition shaft 84 and from two diagonally opposing directions of the power composition shaft 84.

The power assisting bicycle 1 may be driven by the footpedal-propelling power only, like an ordinary bicycle. In such unassisted cycling, the rotating power of the crank shaft 33 is once transmitted to the power composition shaft 84 via the footpedal-propelling power transmission mechanism 102, and the rotation of the power composition shaft 84 is then output to the rear wheel 26 via the power composition output mechanism 103.

During the unassisted cycling, the one-way clutch 88 mounted on the power composition shaft 84 functions as the footpedal-propelling power disengagement means for disengaging the electric motor 55 from the footpedal-propelling power operation. As already described, the one-way clutch 88 transmits the rotation of the assist power driven sprocket 87 to the power composition shaft 84 when the electric motor 55 runs, while the one-way clutch 88 disengages the power composition shaft 84 from the assist power driven sprocket 87 during the unassisted cycling, allowing the power composition shaft 84 to idle relative to the assist power driven sprocket 87. Thus, the electric motor 55 is prevented from being back-driven by the footpedal-propelling power.

Since the one-way clutch 88 as the footpedal-propelling power disengagement means is mounted on the power composition shaft 84, the power transmission system starting from the electric motor 55 all the way to the reduction unit made up of the planetary reduction mechanism 60 and the reduction gear train 82 to the assist power transmission mechanism 101 is free from back-driving. The friction and inertia in rotation associated with the power transmission system are not transmitted to the crank shaft 33, and thus the footpedal-propelling power required is substantially lightened.

The footpedal-propelling power transmission mechanism 102 is positioned between the assist power transmission mechanism 101 and the power composition output mechanism 103 in the transverse direction of the bicycle, and the one-way clutch 88 is positioned between the footpedal-propelling power transmission mechanism 102 and the assist power transmission mechanism 101. The one-way clutch 88 is thus arranged in the widest transverse span, namely in the span between the footpedal-propelling power transmission mechanism 102 and the assist power transmission mechanism 101. Thus, the one-way clutch 88 is mounted without increasing the transverse dimension of the power assist apparatus 3.

The one-way clutch 94 mounted on the crank shaft 33 functions as reverse rotational means that allows the crank shaft 33 to rotate in the reverse direction. As already described, the one-way clutch 94 transmits the rotation of the crank shaft 33 in the F1 direction only to the footpedal-propelling power drive sprocket 93 and disengages the crank shaft 33 from the footpedal-propelling power drive sprocket 93 when the crank shaft 33 rotates in the reverse direction, allowing the footpedal-propelling power drive sprocket 93 to idle relative to the crank shaft 33 and thereby allowing the crank shaft 33 to rotate in the reverse direction.

Since the crank shaft 33 is designed to rotate in the reverse direction, the cyclist may enjoy the bicycle to its natural cycling feel by carrying himself forward on the bicycle with the effect of inertia without treadling its pedals 35, or by alternating forward-pedalling and backward-pedalling the bicycle in a seesaw-like motion.

The one-way clutch 94 as the reverse rotational means is mounted on the crank shaft 33 and arranged between the footpedal-propelling power transmission mechanism 102 and the assist power transmission mechanism 101. Thus, the one-way clutch 94 as the reverse rotational means on the crank shaft 33 comes after the one-way clutch 88 as the footpedal-propelling power disengagement means on the power composition shaft 84, along a fore-and-after line. The one-way clutch 94 is thus mounted without enlarging the transverse dimension of the power assist apparatus 3.

Furthermore, since the slowdown direction of the one-way clutch 88 with respect to the assist power transmission mechanism 101 accords with the slowdown direction of the one-way clutch 94 with respect to the footpedal-propelling power transmission mechanism 102, the one-way clutches 88 and 94 can be standardized to an identical design.

In this embodiment, a unit A into which the one-way clutch 88 and the assist power driven sprocket 87 are integrated and a unit B in which the one-way clutch 94 and the footpedal-propelling power drive sprocket 93 are integrated are constructed of identical units, and both the units are assembled with their directions reversed.

As described above, the one-way clutch 88 and the one-way clutch 94 are standardized to the identical design, the components or parts of the power assist apparatus 3 can be reduced and the ease of manufacturing of the power assist apparatus 3 can be promoted.

As already described, the casing 45 of the power assist apparatus 3 is made up of the center case 46 and the side cases 47 and 48 mounted on the left-hand and right-hand sides of the center case 46, respectively, transversely across the bicycle.

As shown in FIG. 2, the side case 47 mounted on the left-hand side of the center case 46 has a plurality of locking seats 121 on its inside along its periphery. Each of the locking seats 121 is provided with an internal thread 122. The center case 46 has a plurality of locking seats 123 in the positions corresponding to the locking seats 121 (reference is also made to FIG. 3). The locking seats 123 are provided on the leftmost end of the center case 46, and each have through-holes 124.

Locking members 125 inserted through the through-holes 124 in the locking seats 123 from the right of the center case 46 are screwed into the internal threads 122 formed in the locking seats 121 of the side case 47 and thus the side case 47 is secured to the center case 46. The locking members 125 may be bolts or screws.

The side case 48 to be mounted on the right-hand side of the center case 46 has a plurality of locking seats 126 on its inside along its periphery. Each of the locking seats 126 has an internal thread 127. The center case 46 has a plurality of locking seats 128 in the positions corresponding to the locking seats 126. Each of the locking seats 128 has a through-hole 129.

Locking members 131 inserted through the through-hole 129 in the locking seats 128 from the left of the center case 46 are screwed into the internal threads 127 formed in the locking seats 126 of the side case 48 and thus the side case 48 is secured to the center case 46.

The side case 47 mounted on the left-hand side of the center case 46 is secured by the locking members 125 inserted from the right of the center case 46, while the side case 48 mounted on the right-hand side of the center case 46 is secured by the locking members 131 inserted from the left of the center case 46. The left and right side cases 47, 48 are thus secured by the locking members 125, 131 from inside the casing 45 (from the center case 46 side). The heads of the locking members 125, 131 are not exposed out of the surface of each of the side cases 47, 48 and the side surfaces of the casing 45 one thus made smooth.

Therefore, the power assist apparatus 3 has an enhanced aesthetic appearance, while preventing the heads of the locking members 125, 131 from catching the extremities and clothing of the cyclist who treadles the pedals 35.

The electric motor 55 has a plurality of locking seats 132 in the positions corresponding to the locking seats 126 of the side case 48 and the locking seats 128 of the center case 46, and each of the locking seats 132 is provided with a through-hole 133.

When the side case 48 is mounted onto the center case 46, both ends of each of the locking seats 132 of the electric motor 55 are engaged with the respective locking seat 126 and the respective locking seat 128. Therefore, the through-holes 133 of the locking seats 132 are coaxially engaged with the respective internal threads 127 of the locking seats 126 and the respective through-holes 129 of the locking seats 128.

The locking members 131 for the side case 48 are inserted through the through-holes 129 of the locking seats 128 and the through-holes 133 of the locking seats 132, and then screwed into the internal threads 127 of the locking seats 126. The locking members 131 therefore secure together the electric motor 55, the side case 48 and the center case 46.

When both the electric motor 55 and the side case 48 are secured together to the center case 46 with the locking members 131 in this way, the locking seats 132 of the electric motor 55 are tightly sandwiched between the locking seats 128 of the center case 46 and the locking seats 126 of the side case 48, and thus heat of the electric motor 55 may easily escape to the casing 45 through the locking seats 132, 126 and 128.

Although the electric motor 55 is sealed in the casing 45 in the power assist apparatus 3, the cooling performance of the electric motor 55 is improved. In order to further enhance the cooling performance of the electric motor 55, the center case 46 and the side case 48 may be constructed of a material having high thermal conductivity, such as aluminum alloy, or the side case 48 may be formed with cooling fins or the like.

With the electric motor 55 and the side case 48 secured together, the locking members 131 for the side case 48 are also used as locking members for the electric motor 55. The quantity of the locking members required is thus reduced. Furthermore, this arrangement not only promotes the ease of manufacturing of the power assist apparatus 3, but also reduces the weight and cost of the power assist apparatus 3.

The construction of the casing 45 is not limited to the above-described embodiment. As long as a casing is made up of a plurality of case members arranged in the transverse direction of the bicycle, the above advantage will be provided with the electric motor 55 sandwiched between two case members.

What is claimed is:

1. A power assist apparatus of a power assisted bicycle comprising:
    a crank shaft extending in a transverse direction of a body of a bicycle and rotatably driven by a footpedal-propelling power;
    an electric motor mounted to the body of the bicycle for generating an assist power;
    a power composition shaft rotatably supported and extending in parallel with the crank shaft;
    a footpedal-propelling power transmission mechanism for transmitting the footpedal-propelling power to the power composition shaft at a right angle to an axis of the power composition shaft;
    an assist power transmission mechanism for transmitting the assist power to the power composition shaft at a right angle to the axis of the power composition shaft in a direction opposite to a direction in which the footpedal-propelling power is transmitted;
    a power composition output mechanism for outputting a rotating power of the power composition shaft to a driven wheel;
    a moment sensor for sensing a moment difference between two moments acting on the power composition shaft from two opposite directions when the footpedal-propelling power and the assist power are transmitted; and
    a control unit for calculating an assist ratio of the assist power to the footpedal-propelling power based on magnitude and direction of a moment difference output by the moment sensor and for controlling an output of the electric motor so that the assist ratio is kept constant.

2. A power assist apparatus of a power assisted bicycle according to claim 1, wherein a positional relationship of the footpedal-propelling power transmission mechanism, the assist power transmission mechanism and the power composition output mechanism relative to the power composition shaft is set up such that the assist ratio is set to a predetermined value when the moment difference is zero.

3. A power assist apparatus of a power assisted bicycle according to claim 2, comprising a casing which houses said crank shaft, said electric motor and said power composition shaft, said casing comprising a center case disposed at a central portion thereof transversely across the bicycle body, a left side case secured to a left-hand side of the center case, and right a side case secured to secured to the right-hand side of the center case, said left side case being secured with locking members inserted from the right-hand side of the center case and said right side case being secured with locking members inserted from the left-hand side of the center case.

4. A power assist apparatus of a power assisting bicycle according to claim 3, wherein the electric motor is disposed between the center case and the side case, and the locking members which secure the side cases to the center case secure together the electric motor to the center case.

5. A power assist apparatus of a power assisted bicycle according to claim 1, wherein the moment sensor detects the moment difference acting on the power composition shaft by measuring a load added on one end of the power composition shaft.

6. A power assist apparatus of a power assisted bicycle according to claim 5, comprising a casing which houses said crank shaft, said electric motor and said power composition shaft, said casing comprising a center case disposed at a central portion thereof transversely across the bicycle body, a left side case secured to a left-hand side of the center case, and right a side case secured to secured to the right-hand side of the center case, said left side case being secured with locking members inserted from the right-hand side of the center case and said right side case being secured with locking members inserted from the left-hand side of the center case.

7. A power assist apparatus of a power assisting bicycle according to claim 6, wherein the electric motor is disposed between the center case and the side case, and the locking members which secure the side cases to the center case secure together the electric motor to the center case.

8. A power assist apparatus of a power assisted bicycle according to claim 1, further comprising a reduction unit for reducing the rotational speed of the electric motor and a footpedal-propelling power disengagement mechanism which disengages the electric motor from the footpedal-propelling power during unassisted cycling, said footpedal-propelling power disengagement mechanism being disposed on the power composition shaft.

9. A power assist apparatus of a power assisted bicycle according to claim 8, wherein the footpedal-propelling power transmission mechanism is disposed between the assist power transmission mechanism and the power composition output mechanism in the transverse direction of the bicycle body and the footpedal-propelling power disengagement mechanism is disposed between the footpedal-propelling power transmission mechanism and the assist power transmission mechanism.

10. A power assist apparatus of a power assisted bicycle according to claim 9, comprising a casing which houses said crank shaft, said electric motor and said power composition shaft, said casing comprising a center case disposed at a central portion thereof transversely across the bicycle body, a left side case secured to a left-hand side of the center case, and right a side case secured to secured to the right-hand side of the center case, said left side case being secured with locking members inserted from the right-hand side of the center case and said right side case being secured with locking members inserted from the left-hand side of the center case.

11. A power assist apparatus of a power assisting bicycle according to claim 10, wherein the electric motor is disposed between the center case and the side case, and the locking members which secure the side cases to the center case secure together the electric motor to the center case.

12. A power assist apparatus of a power assisted bicycle according to claim 8, comprising a casing which houses said crank shaft, said electric motor and said power composition shaft, said casing comprising a center case disposed at a central portion thereof transversely across the bicycle body, a left side case secured to a left-hand side of the center case, and right a side case secured to secured to the right-hand side of the center case, said left side case being secured with locking members inserted from the right-hand side of the center case and said right side case being secured with locking members inserted from the left-hand side of the center case.

13. A power assist apparatus of a power assisting bicycle according to claim 12, wherein the electric motor is disposed between the center case and the side case, and the locking members which secure the side cases to the center case secure together the electric motor to the center case.

14. A power assist apparatus of a power assisted bicycle according to claim 1, further comprising, on the crank shaft, a reverse rotational mechanism which enables the crank shaft to rotate in a reverse direction, said reverse rotational mechanism being disposed to the side of the assist power transmission mechanism relative to the footpedal-propelling power transmission mechanism.

15. A power assist apparatus of a power assisted bicycle according to claim 14, comprising a casing which houses said crank shaft, said electric motor and said power composition shaft, said casing comprising a center case disposed at a central portion thereof transversely across the bicycle body, a left side case secured to a left-hand side of the center case, and right a side case secured to secured to the right-hand side of the center case, said left side case being secured with locking members inserted from the right-hand side of the center case and said right side case being secured with locking members inserted from the left-hand side of the center case.

16. A power assist apparatus of a power assisting bicycle according to claim 15, wherein the electric motor is disposed between the center case and the side case, and the locking members which secure the side cases to the center case secure together the electric motor to the center case.

17. A power assist apparatus of a power assisted bicycle according to claim 1, comprising a casing which houses said crank shaft, said electric motor and said power composition shaft, said casing comprising a center case disposed at a central portion thereof transversely across the bicycle body, a left side case secured to a left-hand side of the center case, and right a side case secured to secured to the right-hand side of the center case, said left side case being secured with locking members inserted from the right-hand side of the center case and said right side case being secured with locking members inserted from the left-hand side of the center case.

18. A power assist apparatus of a power assisting bicycle according to claim 17, wherein the electric motor is disposed between the center case and the side case, and the locking members which secure the side cases to the center case secure together the electric motor to the center case.

19. A power assist apparatus of a power assisted bicycle comprising:

a crank shaft driven by a footpedal-propelling power;

an electric motor for generating an assist power;

a power composition shaft;

a footpedal-propelling power transmission mechanism for transmitting the footpedal-propelling power to the power composition shaft at a right angle to a rotational axis of the power composition shaft;

an assist power transmission mechanism for transmitting the assist power to the power composition shaft at a right angle to the rotational axis of the power composition shaft in a direction opposite to a direction in which the footpedal-propelling power is transmitted;

a power composition output mechanism for outputting a rotating power of the power composition shaft to a driven wheel;

a moment sensor for sensing a moment difference between two moments acting on the power composition shaft from two opposite directions when the footpedal-propelling power and the assist power are transmitted; and a processor for calculating an assist ratio of the assist power to the footpedal-propelling power based on magnitude and direction of a moment difference output by the moment sensor and for controlling an output of the electric motor so that the assist ratio is kept constant.

* * * * *